(12) United States Patent
Matsuoka

(10) Patent No.: US 9,699,387 B2
(45) Date of Patent: Jul. 4, 2017

(54) IMAGE PROCESSING DEVICE FOR PROCESSING PUPIL-DIVIDED IMAGES OBTAINED THROUGH DIFFERENT PUPIL REGIONS OF AN IMAGING OPTICAL SYSTEM, CONTROL METHOD THEREOF, AND PROGRAM

(71) Applicant: CANON KABUSHIKI KAISHA, Tokyo (JP)

(72) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 14/662,781

(22) Filed: Mar. 19, 2015

(65) Prior Publication Data

US 2015/0281540 A1 Oct. 1, 2015

(30) Foreign Application Priority Data

Mar. 26, 2014 (JP) .................................. 2014-064116

(51) Int. Cl.
*H04N 5/235* (2006.01)
*H04N 5/357* (2011.01)
*H04N 5/355* (2011.01)

(52) U.S. Cl.
CPC ......... *H04N 5/2355* (2013.01); *H04N 5/3572* (2013.01); *H04N 5/35554* (2013.01)

(58) Field of Classification Search
CPC . H04N 5/2355; H04N 5/3572; H04N 5/35554
See application file for complete search history.

(56) References Cited

U.S. PATENT DOCUMENTS

| 2011/0058070 | A1* | 3/2011 | Awazu ............... | H04N 5/23212 348/241 |
| 2012/0249846 | A1* | 10/2012 | Nishio et al. ..... | H01L 27/14603 348/294 |
| 2013/0162625 | A1* | 6/2013 | Schmit et al. ............ | G06T 3/40 345/419 |
| 2014/0347532 | A1* | 11/2014 | Kang et al. ............ | H04N 5/351 348/294 |

FOREIGN PATENT DOCUMENTS

| JP | 2002-199284 A | 7/2002 |
| JP | 2009-258868 A | 11/2009 |
| JP | 2013-125095 A | 6/2013 |

\* cited by examiner

*Primary Examiner* — Dennis Hogue
(74) *Attorney, Agent, or Firm* — Canon USA Inc., IP Division

(57) ABSTRACT

The image processing device includes an imaging unit configured to capture a plurality of pupil-divided images obtained from light fluxes passing through different pupil regions of an imaging optical system, and a control unit configured to select images to be used for image processing from the pupil-divided images captured by the imaging unit, according to the position of the imaging area in the imaging unit.

12 Claims, 10 Drawing Sheets

IMAGE PROCESSING DEVICE FOR PROCESSING PUPIL-DIVIDED IMAGES OBTAINED THROUGH DIFFERENT PUPIL REGIONS OF AN IMAGING OPTICAL SYSTEM, CONTROL METHOD THEREOF, AND PROGRAM

BACKGROUND OF THE INVENTION

Field of the Invention

The present invention relates to an image processing device configured to process so-called pupil-divided images and a control method thereof, and a program for causing a computer to perform the control method.

Description of the Related Art

Conventionally, a method of enlarging the dynamic range of an image sensor using pupil-divided images has been proposed. For example, Japanese Patent Application Laid-Open No. 2002-199284, described below, discloses a technique of enlarging the dynamic range of a sensor by changing the accumulation time or readout gain by different pupil-divided images to thereby obtain a plurality of images of different exposures, and synthesizing those images.

Further, it has been known conventionally that pupil intensity distribution differs from one pupil-divided image to another. Examples of such technique are disclosed in Japanese Patent Application Laid-Open No. 2013-125095, and Japanese Patent Application Laid-Open No. 2009-258868, described below, for example.

However, in the dynamic range enlargement addition mode disclosed in Japanese Patent Application Laid-Open No. 2002-199284 described above, an influence of shading due to vignetting of a pupil reduces a dynamic range enlargement effect.

SUMMARY OF THE INVENTION

An image processing device of the present invention includes an image sensor configured to capture a plurality of pupil-divided images obtained from light fluxes passing through different pupil regions of an imaging optical system, and a selection unit configured to select images to be used for image processing from the pupil-divided images, according to the position of the imaging area in the image sensor.

Further, the present invention includes a method of controlling the image processing device described above, and a program for causing a computer to perform the control method.

Further features of the present invention will become apparent from the following description of exemplary embodiments (with reference to the attached drawings).

DESCRIPTION OF THE EMBODIMENTS

Hereinafter, modes for carrying out the present invention (embodiments) will be described with reference to the drawings. It should be noted that in the embodiments of the present invention, while description will be given on an example of applying a digital camera as an image processing device of the present invention, the present invention is not limited to the digital camera.

First, conventional art according to Japanese Patent Application Laid-Open No. 2002-199284 will be described using FIG. 9.

Figure 9:
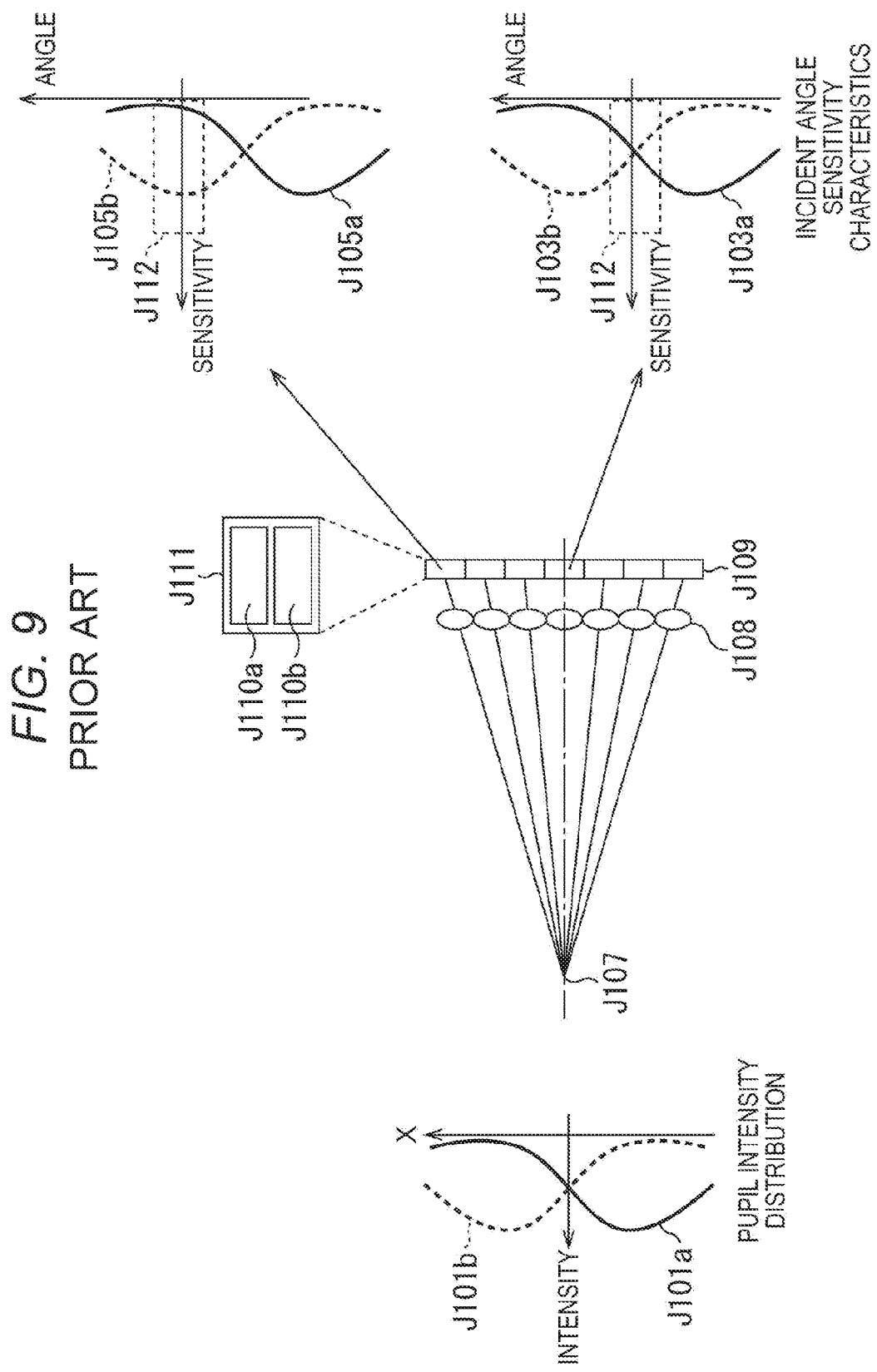
FIG. 9 is a drawing for explaining pupil intensity distribution on a pupil surface of an imaging device, and incident angle sensitivity characteristics on an image plane of an image sensor.

FIG. 9 is a drawing for explaining pupil intensity distribution on a pupil surface of an imaging device and incident angle sensitivity characteristics on an image plane of an image sensor.

A reference sign J107 denotes a pupil surface of an imaging device. A reference sign J108 denotes a micro lens array. A reference sign J109 denotes a pixel array consisting of a plurality of pixels. For example, the micro lens array J108 and the pixel array J109 constitute an image sensor. A reference sign J111 denotes one pixel (main pixel). The one pixel (main pixel) J111 is configured to include a plurality of photoelectric conversion units (specifically, a subpixel denoted by J110a and a subpixel denoted by J110b), similar to Japanese Patent Application Laid-Open No. 2013-125095 described above.

In Japanese Patent Application Laid-Open No. 2013-125095 described above, the pupil intensity distribution of the subpixel J110a becomes the one as denoted by J101a, and the pupil intensity distribution of the subpixel J110b becomes the one as denoted by J101b, due to vignetting of the pupil.

Further, the incident angle sensitivity characteristics at the center of the image plane, corresponding to the pupil intensity distributions J101a and J101b, become the ones as denoted by J103a and J103b, respectively. In this case, the incident angle sensitivity characteristic of the subpixel J110a becomes the one as denoted by J103a, and the incident angle sensitivity characteristic of the subpixel J110b becomes the one as denoted by J103b. Further, a reference sign J112 denotes an angle range of incident light restricted by the diaphragm or the like. As described above, at the center of the image plane, the quantities of light made incident on the subpixel J110a and the subpixel J110b are the same.

Further, the incident angle sensitivity characteristics on the edge of the image plane corresponding to the pupil intensity distributions J101a and J101b become the ones denoted by J105a and J105b, respectively. In this case, the incident angle sensitivity characteristic of the subpixel J110a becomes the one as denoted by J105a, and the incident angle sensitivity characteristic of the subpixel J110b becomes the one as denoted by J105b. As the focus position on the edge of the image plane differs from that at the center of the image plane, the incident angle sensitivity characteristic on the edge of the image plane has a profile eccentric to the center of the image plane. As such, in the case illustrated in FIG. 9, the quantity of light made incident on the subpixel J110b is larger than the quantity of light made incident on the subpixel J110a, on the edge of the image plane.

Figure 10:
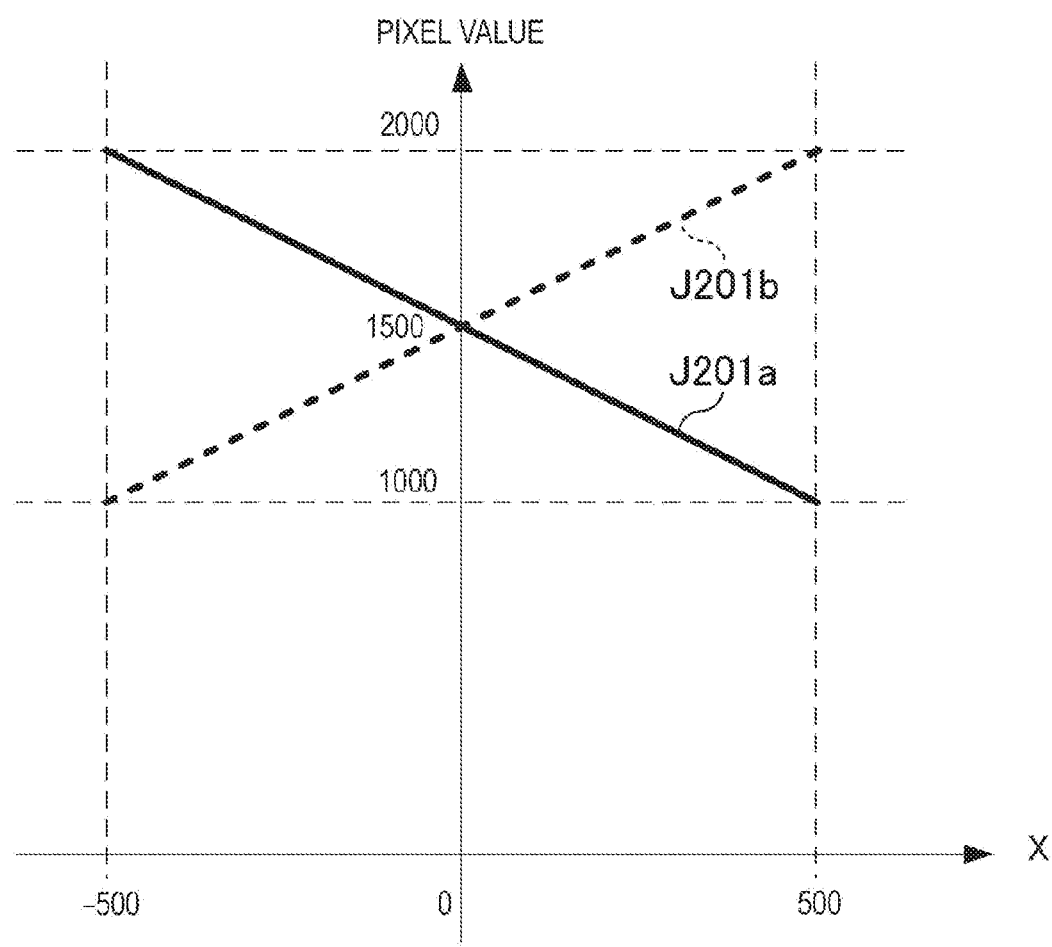
FIG. 10 is a drawing for explaining shading characteristics of two subpixels illustrated in FIG. 9.

In view of the above, the shading characteristic representing the relationship between a pixel position (X) and a pixel value on the image plane is as illustrated in FIG. 10. FIG. 10 is a drawing for explaining shading characteristics of the two subpixels J110a and J110b illustrated in FIG. 9.

A reference sign J201a denotes a shading characteristic of the subpixel J110a illustrated in FIG. 9. A reference sign J201b denotes a shading characteristic of the subpixel J110b illustrated in FIG. 9. The center of the image plane illustrated in FIG. 9 corresponds to X=0, and the edge of the image plane corresponds to X=500.

Figure 11:
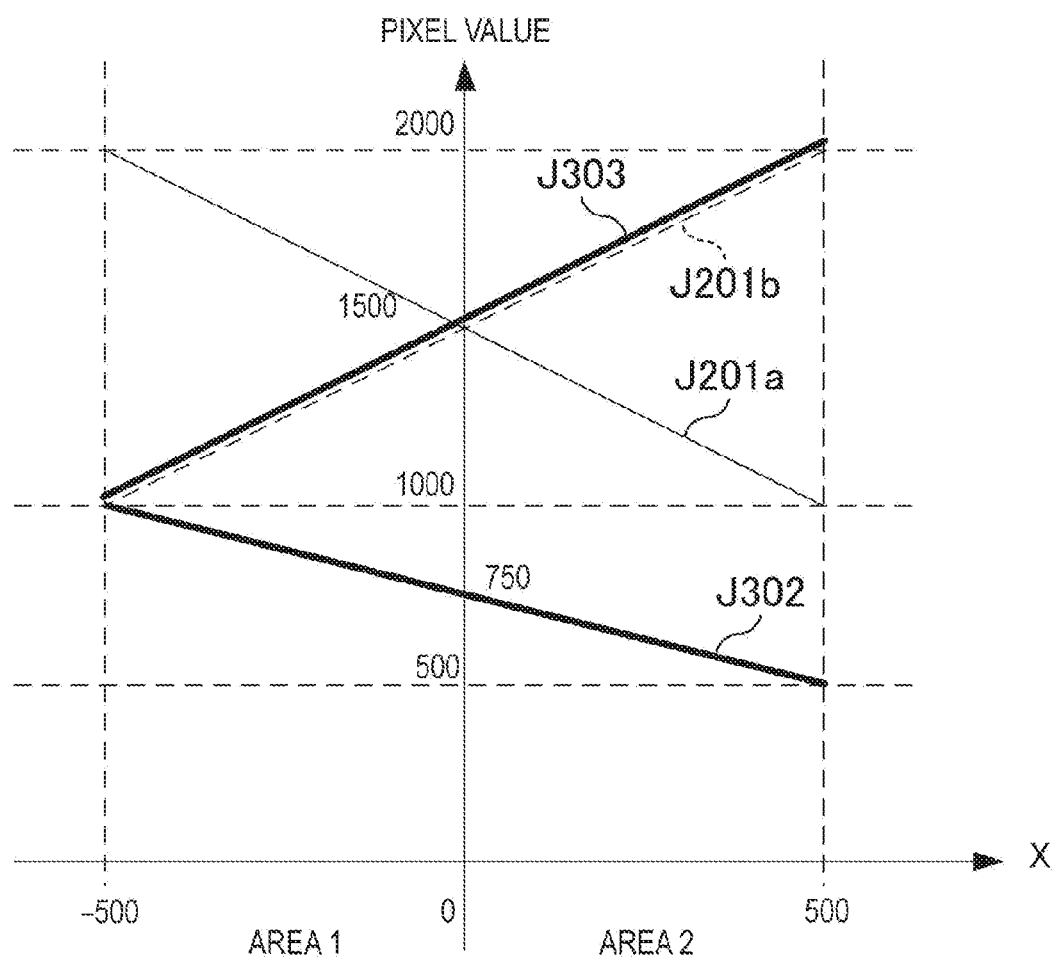
FIG. 11, illustrating a conventional example, is a drawing for explaining exemplary processing of obtaining a plurality of images of different exposures by each of different pupil-divided images obtained in the two subpixels illustrated in FIG. 9.

FIG. 11, illustrating a conventional example, is a drawing for explaining exemplary processing of obtaining a plurality of images of different exposures by each of different pupil-divided images obtained in the two subpixels J110a and J110b illustrated in FIG. 9.

A reference sign J303 denotes a pupil-divided image captured by setting proper exposure to the subpixel J110b illustrated in FIG. 9 (proper exposure image). Further, a reference sign J302 denotes a pupil-divided image captured by setting underexposure by one level (1 EV) to the subpixel J110a illustrated in FIG. 9 (underexposure image).

The dynamic range enlargement addition mode, described in Japanese Patent Application Laid-Open No. 2002-199284 described above, is an operation of reading a synthetic image from a solid-state image sensor after adding and synthesizing the underexposure image J302 and the proper exposure image J303, illustrated in FIG. 11, in the floating diffusion (FD) region of the solid-state image sensor. Further, in the above-descried example, an exposure level difference in the division photoelectric conversion unit is 1 level.

However, in the dynamic range enlargement addition mode disclosed in Japanese Patent Application Laid-Open No. 2002-199284 described above, the dynamic range enlargement effect is reduced by the shading influence caused by vignetting of the pupil. As such, in the underexposure image J302 and the proper exposure image J303 illustrated in FIG. 11, while it is possible to secure an exposure level difference of 1 level or more in an area of the imaging areas of the image sensor, only an exposure level difference less than 1 level is secured in an area 1 of the imaging areas of the image sensor. If image synthesizing is performed in the case where an exposure level difference is not secured as in this case, a problem of degradation of the image quality after the image synthesizing is caused.

Here, even in the conventional art disclosed in Japanese Patent Application Laid-Open No. 2002-199284 described above, if a normal addition mode is used, an influence of shading caused by vignetting of the pupil is offset between the subpixel J110a and the subpixel J110b illustrated in FIG. 9, so that it can be disregarded. As such, in the normal addition mode, if exposure is performed in two separate accumulations including an accumulation with underexposure for an underexposure image and an accumulation with proper exposure for a proper exposure image, it is possible to enlarge the dynamic range by performing dynamic range enlargement addition after the readout. In the case of two separate accumulations as described above, as both the underexposure image and the proper exposure image are affected by the hand shake of the photographer, alignment of images performed in the conventional art as disclosed in Japanese Patent Application Laid-Open No. 2009-258868 is required. This means that it is necessary to detect a motion vector by block matching between the underexposure image and the proper exposure image to thereby calculate an alignment parameter, for example.

However, in the normal addition mode of Japanese Patent Application Laid-Open No. 2002-199284 described above, as the opening of the pupil increases compared with that of the non-addition mode, the depth of field becomes shallower, whereby the focusing area in the image becomes narrower. As such, the block matching function in the increased not-in-focus area is degraded, and a motion vector cannot be detected, whereby the image alignment function is degraded, consequently. This causes a problem that the image quality of an obtained image deteriorates. As such, in the present embodiment, as images used for image synthesizing processing are selected from a plurality of pupil-divided images according to a position of the imaging area in the imaging unit, it is possible to prevent degradation of the quality of an image when performing dynamic range enlargement processing.

First Embodiment

First, a first embodiment of the present invention will be described.

Figure 1:
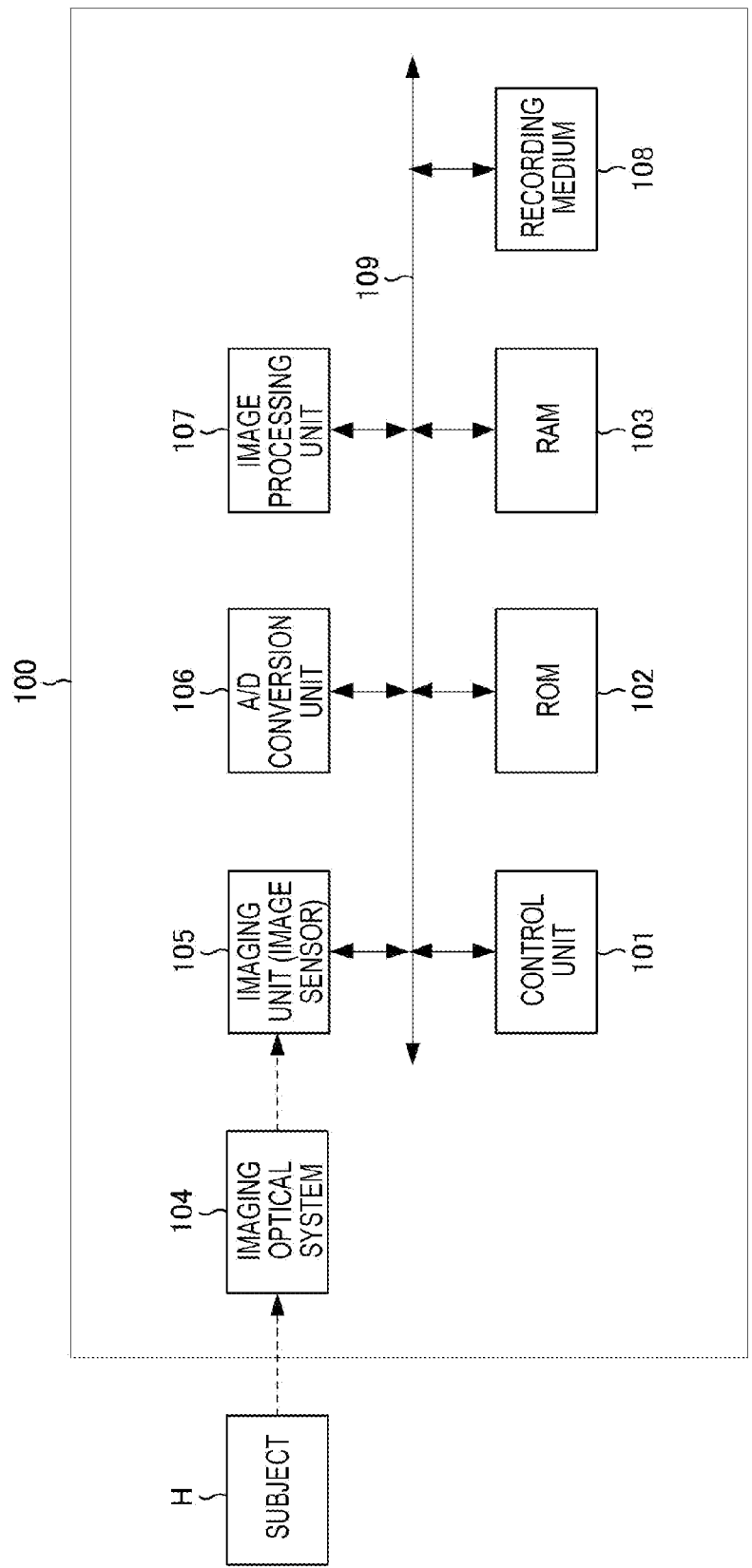
FIG. 1 is a block diagram illustrating an example of a schematic configuration of a digital camera (image processing device) according to a first embodiment of the present invention.

FIG. 1 is a block diagram illustrating an example of a schematic configuration of a digital camera (image processing device) according to the first embodiment of the present invention.

A reference sign 100 denotes a digital camera (image processing device) of the present embodiment.

A reference sign 101 denotes a control unit configured of a CPU, for example. The control unit 101 reads, from a ROM 102 described below, operation programs of respective block configurations provided in the digital camera 100, and develops them in a RAM 103, described below, and executes them, to thereby control operations of the respective block configurations provided in the digital camera 100.

A reference sign 102 denotes a ROM configured of a rewritable non-volatile memory, for example. The ROM 102 stores information such as parameters necessary for operation of the respective block configurations, in addition to the operation programs of the respective block configurations provided in the digital camera 100.

A reference sign 103 denotes a RAM configured of a rewritable volatile memory, for example. The RAM 103 is used as a temporary storage area of data or the like output in the operations of the respective block configurations provided in the digital camera 100.

A reference sign 104 denotes an imaging optical system including a lens and the like, for focusing an optical image from a subject H on an imaging unit 105.

A reference sign 105 denotes an imaging unit configured of an image sensor such as a CCD or a CMOS sensor, for example, which divides a light flux from the subject H passing through the pupil of the imaging optical system 104 to thereby capture a plurality of pupil-divided images (a plurality of pupil-divided images obtained from light fluxes passing through different pupil regions of the imaging optical system 104). The imaging unit 105 is configured to include the micro lens array J108 and the pixel array J109 illustrated in FIG. 9. One pixel (main pixel) J111 of the pixel array J109 is pupil-divided by the micro lens to thereby form a plurality of photoelectric conversion units (specifically, the two subpixels J110a and J110b illustrated in FIG. 9), for example. In the present embodiment, while each main pixel is covered by a color filter of R, G, or B (the colors of subpixels corresponding to one main pixel are the same), configuration of an image sensor to which the present invention is applicable is not limited to this. Further, the imaging unit 105 is configured of an image sensor capable of being used for both imaging and focus detection. The imaging unit 105 also photoelectrically converts an optical image of the subject H focused by the imaging optical system 104, and outputs the obtained analog image signal to an A/D conversion unit 106 described below.

A reference sign 106 denotes an A/D conversion unit which performs A/D conversion processing on the analog image signal input from the imaging unit 105 to thereby convert it to a digital image signal. Then, the A/D conversion unit 106 outputs digital image data based on the obtained digital image signal to the RAM 103, and stores it therein.

A reference sign 107 denotes an image processing unit. The image processing unit 107 performs white balance processing, noise reduction processing, color suppression processing, matrix transformation processing, gamma conversion processing, and the like, on image data stored in the RAM 103. The image processing unit 107 also generates image data in which the dynamic range is enlarged by HDR synthesis processing in the course of processing the image data, stored in the RAM 103, in the above-described manner. Moreover, the image processing unit 107 encodes and compresses images on which the HDR synthesis processing has been performed or images which are not synthesized, in accordance with a coding method for recording still images (JPEG or the like) or for recording motion pictures (MPEG, H.264, H.265, or the like), and outputs them.

A reference sign 108 denotes a recording medium such as a memory card configured to be attachable to or detachable from the digital camera 100, for example. In the recording medium 108, image data processed by the image processing unit 107, image data obtained by A/D conversion performed by the A/D conversion unit 106, and the like, stored in the RAM 103, are recorded as recorded image data.

A reference sign 109 denotes a bus. The bus 109 connects the respective block configurations (101 to 103, 105 to 108), provided in the digital camera 100, with one another in a communicable manner.

Next, operation of the digital camera 100 according to the first embodiment, the inner configuration of the image processing unit 107 according to the first embodiment, and the like will be described using FIGS. 2 to 6.

Figure 6:
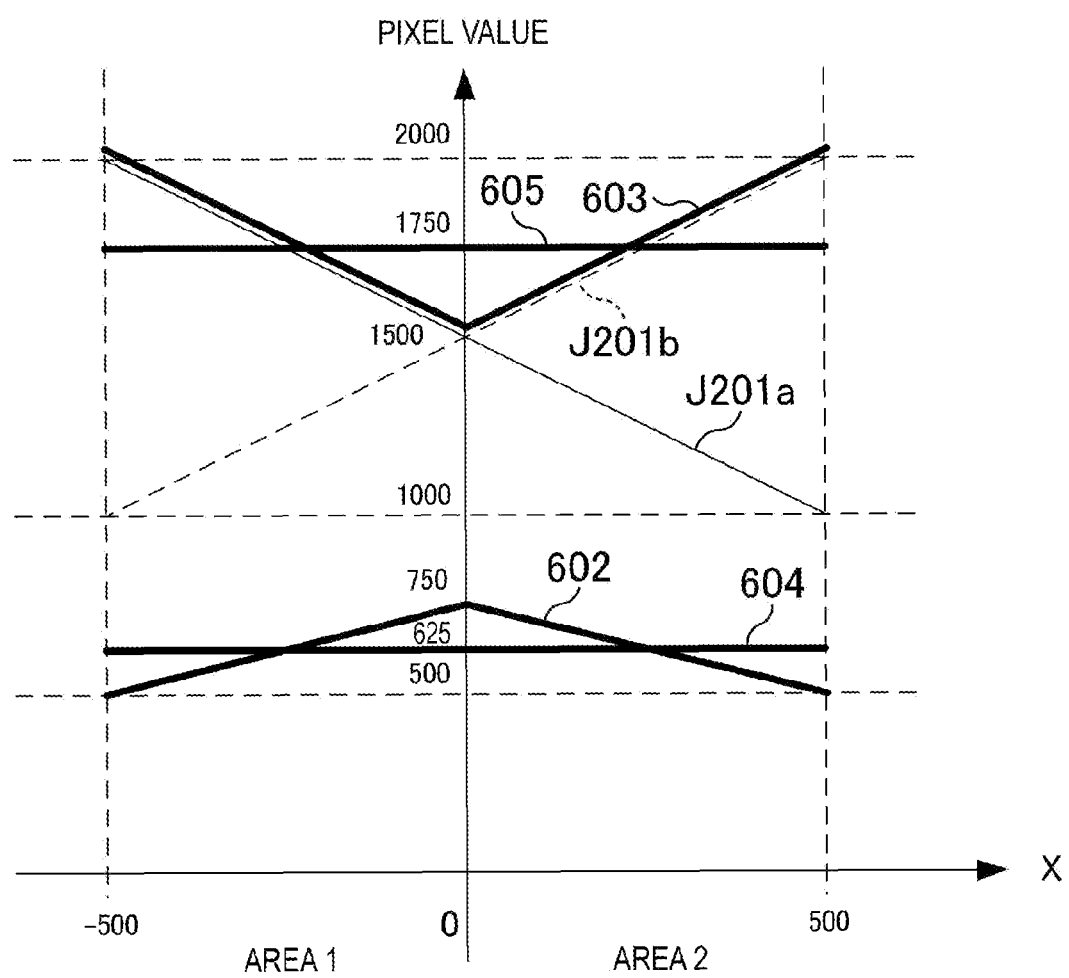
FIG. 6 is a drawing for explaining exemplary processing of obtaining two images of different exposures in a digital camera (image processing device) according to the first embodiment of the present invention.

FIG. 6 is a drawing for explaining exemplary processing of obtaining two images of different exposures in the digital camera (image processing device) according to the first embodiment of the present invention. In FIG. 6, the horizontal axis shows the pixel position (X) in the imaging area of the imaging unit 105, and the vertical axis shows the pixel value.

In FIG. 6, a reference sign J201a denotes a pupil-divided image (image A: first pupil-divided image) obtained from the subpixel J110a (first pixel) illustrated in FIG. 9. A reference sign J201b denotes another pupil-divided image (image B: second pupil-divided image) obtained from the subpixel J110b (second pixel) illustrated in FIG. 9. Further, in the present embodiment, it is assumed that the imaging area in the imaging unit 105 is divided into a plurality of areas including at least an area 1 (first area) and an area 2 (second area), as illustrated in FIG. 6. In FIG. 6, the pupil-divided image J201a is configured such that in the area 1, the vignetting quantity of the pupil of the imaging optical system 104 is smaller (pixel value is larger) than that of the pupil-divided image J201b. Further, the pupil-divided image J201b is configured such that in the area 2, the vignetting quantity of the pupil of the imaging optical system 104 is smaller (pixel value is larger) than that of the pupil-divided image J201a.

In the dynamic range enlargement mode, a signal of a first conversion unit, which is read to the floating diffusion (FD) region first, becomes a short-second exposure signal, and a signal of a second conversion unit, which is read to the FD region later, becomes a long-second exposure signal. This means that in the present embodiment, if a signal of the subpixel J110a illustrated in FIG. 9 is read to the FD region first and a signal of the subpixel J110b is read to the FD region later, the image A becomes an underexposure image and the image B becomes a proper exposure image. On the contrary, if a signal of the subpixel J110b illustrated in FIG. 9 is read to the FD region first and a signal of the subpixel J110a is read to the FD region later, the image B becomes an underexposure image and the image A becomes a proper exposure image. Here, the underexposure image is an image obtained with an underexposure quantity (second exposure quantity) which is less exposure quantity than a proper exposure quantity (first exposure quantity) with which the proper exposure image is obtained.

In the present embodiment, in the area 1 of the imaging area of the imaging unit 105 illustrated in FIG. 6, a signal of the subpixel J110b, illustrated in FIG. 9, is read to the FD region first, while in the area 2 of the imaging area of the imaging unit 105 illustrated in FIG. 6, a signal of the subpixel J110a, illustrated in FIG. 9, is read to the FD region first. Specifically, the control unit 101 controls the imaging unit 105 to select the image A as a proper exposure image 603 to be used for image synthesizing processing described below in the area 1 illustrated in FIG. 6, and select the image B, which is another pupil-divided image other than the image A, as an underexposure image 602 to be used for image synthesizing processing described below, for example. Further, the control unit 101 controls the imaging unit 105 to select the image B as the proper exposure image 603 to be used for image synthesizing processing described below in the area 2 illustrated in FIG. 6, and select the image A which is another pupil-divided image other than the image B as the underexposure image 602 to be used for image synthesizing processing described below. In the present embodiment, the control unit 101 which selects an image to be used for image synthesizing processing constitutes a selection unit. It should be noted that in the present embodiment, while the control unit 101 is configured to select images to be used for image synthesizing processing, a mode of selecting images to be used for image synthesizing processing by the imaging unit 105 itself is also included in the present invention. By performing image selection in this way, even if there is a shading influence caused by vignetting of the pupil of the imaging optical system 104, it is possible to secure a larger exposure level difference than that in the conventional example illustrated in FIG. 11.

Further, in the dynamic range enlargement mode described in Japanese Patent Application Laid-Open No. 2002-199284, while it is described that a synthetic image is read from the solid-state image sensor after two images in which accumulation times of the photoelectric conversion units are different are added and synthesized in the floating diffusion (FD) region, by allowing the two photoelectric conversion units to output images independently, which is the same as the case of a focus detection mode, it is possible to read two images by not adding the two images.

Figure 3:
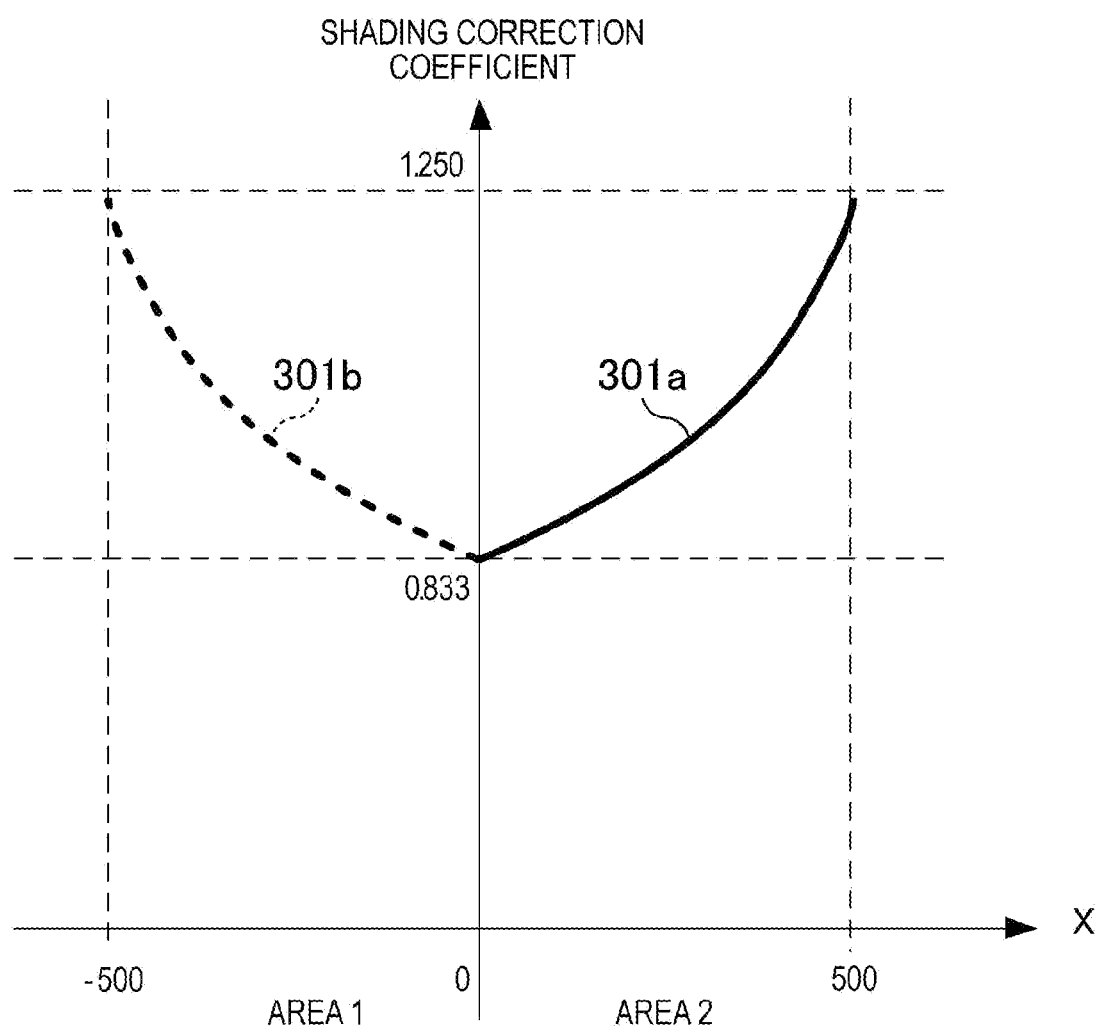
FIG. 3 is a drawing illustrating an example of a shading correction coefficient (underexposure image shading correction coefficient) by which an underexposure image illustrated in FIG. 6 is multiplied.
Figure 4:
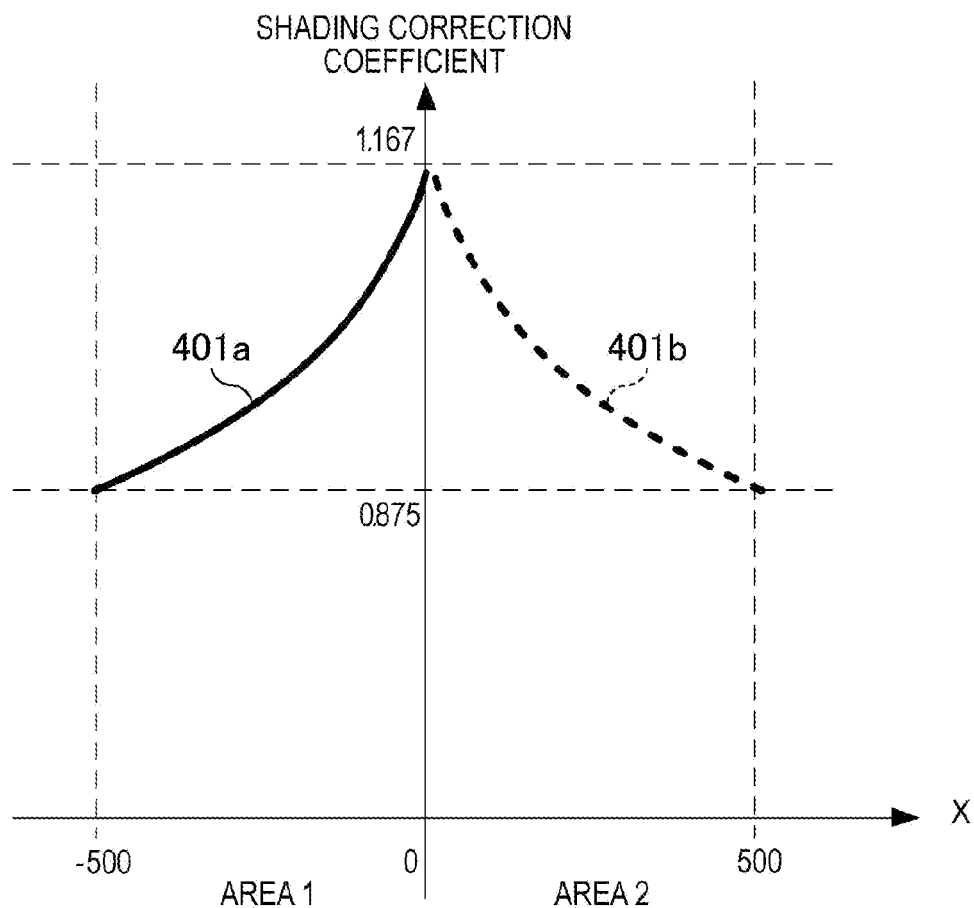
FIG. 4 is a drawing illustrating a shading correction coefficient (proper exposure image shading correction coefficient) by which a proper exposure image illustrated in FIG. 6 is multiplied.

In the present embodiment, shading correction is performed by reading two images having different accumulation times without adding them by the above-described method, and after A/D conversion performed by the A/D conversion unit 106, multiplying a shading correction coefficient having a reverse characteristic of the shading by the image processing unit 107, for example. FIG. 3 is a drawing illustrating an example of a shading correction coefficient (shading correction coefficient for underexposure image) by which the underexposure image 602 illustrated in FIG. 6 is multiplied. Further, FIG. 4 is a drawing illustrating an example of a shading correction coefficient (shading correction coefficient for proper exposure image) by which the proper exposure image 603 illustrated in FIG. 6 is multiplied. In both FIG. 3 and FIG. 4, the horizontal axis shows the pixel position (X) in the imaging area of the imaging unit 105, and the vertical axis shows the shading correction coefficient.

A reference sign 604 in FIG. 6 denotes an underexposure image after shading correction (corrected underexposure image), and a reference sign 605 in FIG. 6 denotes a proper exposure image after shading correction (corrected proper exposure image). In this case, the exposure level difference after the shading correction is 1.5 levels which is uniform in the frame, and in the present embodiment, the corrected underexposure image 604 and the corrected proper exposure image 605 are synthesized to thereby generate a dynamic range enlarged image which is a synthetic image. Through this processing, it is possible to remove brightness nonuniformity due to shading from the dynamic range enlarged image after the image synthesis. Further, in FIG. 6 of the present embodiment, as the exposure level difference within the frame due to shading between the underexposure image and the proper exposure image is smaller than that of the case illustrated in FIG. 11 of the conventional example, it is possible to decrease the shading correction coefficient, whereby noise-induced degradation caused by multiplication of a coefficient can be reduced.

Figure 2:
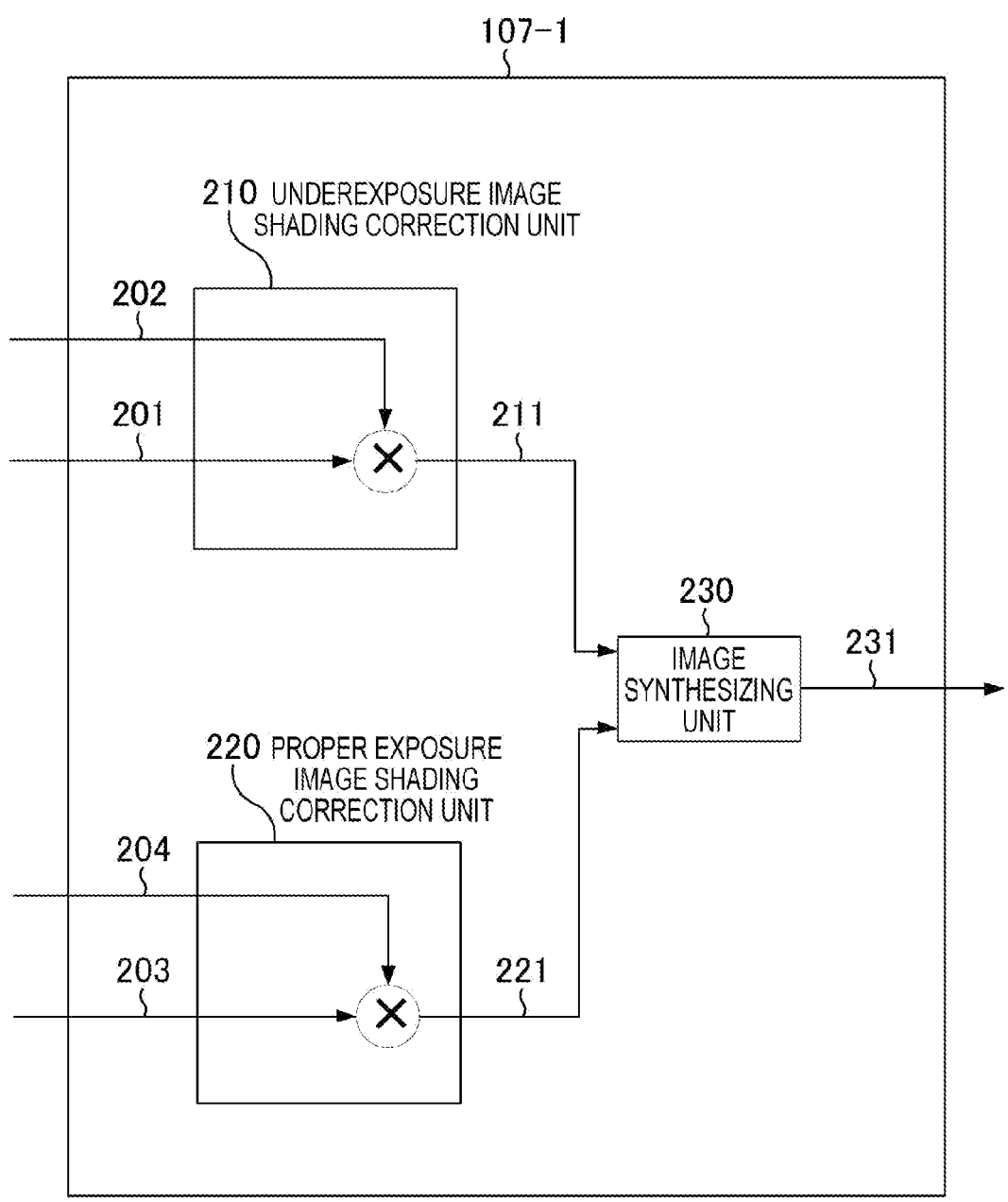
FIG. 2, illustrating the first embodiment of the present invention, is a drawing illustrating an exemplary inner configuration of an image processing unit illustrated in FIG. 1.

FIG. 2, illustrating the first embodiment of the present invention, is a drawing illustrating an exemplary inner configuration of the image processing unit 107 illustrated in FIG. 1. Here, the image processing unit 107 illustrated in FIG. 2 is illustrated as an "image processing unit 107-1".

A reference sign 201 denotes an underexposure image input (input of the underexposure image 602 of FIG. 6). A reference sign 202 denotes an underexposure image shading correction coefficient input (input of a shading correction coefficient for an underexposure image of FIG. 3).

A reference sign 210 is an underexposure image shading correction unit. The underexposure image shading correction unit 210 performs shading correction by multiplying the underexposure image 602 of FIG. 6 by underexposure image shading correction coefficients 301*a* and 301*b* of FIG. 3. Through the shading correction, the corrected underexposure image 604 of FIG. 6 is generated. Further, the underexposure image shading correction coefficients 301*a* and 301*b* in FIG. 3 are read from the ROM 102 illustrated in FIG. 1 and developed in the RAM 103 and then input as the underexposure image shading correction coefficient input 202, for example.

A reference sign 203 denotes a proper exposure image input (input of the proper exposure image 603 of FIG. 6). A reference sign 204 denotes a proper exposure image shading correction coefficient input (input of a proper exposure image shading correction coefficient of FIG. 4).

A reference sign 220 denotes a proper exposure image shading correction unit. The proper exposure image shading correction unit 220 performs shading correction by multiplying the proper exposure image 603 of FIG. 6 by proper exposure image shading correction coefficients 401*a* and 401*b* of FIG. 4. Through the shading correction, the corrected proper exposure image 605 of FIG. 6 is generated. Further, the proper exposure image shading correction coefficients 401*a* and 401*b* of FIG. 4 are read from the ROM 102 illustrated in FIG. 1 and developed in the RAM 103, and then input as the proper exposure image shading correction coefficient input 204, for example.

Here, the underexposure image shading correction unit 210 and the proper exposure image shading correction unit 220 constitute a brightness nonuniformity correction unit for correcting brightness nonuniformity caused by vignetting of the pupil of the imaging optical system 104 with respect to images to be used for image synthesizing processing.

A reference sign 211 denotes a corrected underexposure image input (input of the corrected underexposure image 604 of FIG. 6). A reference sign 221 denotes a corrected proper exposure image input (input of the corrected proper exposure image 605 of FIG. 6).

A reference sign 230 denotes an image synthesizing unit. The image synthesizing unit 230 performs image synthesizing on the corrected underexposure image 604 and the corrected proper exposure image 605 of FIG. 6 to thereby generate a dynamic range enlarged image as a synthetic image. A reference sign 231 denotes a dynamic range enlarged image output.

Figure 5:
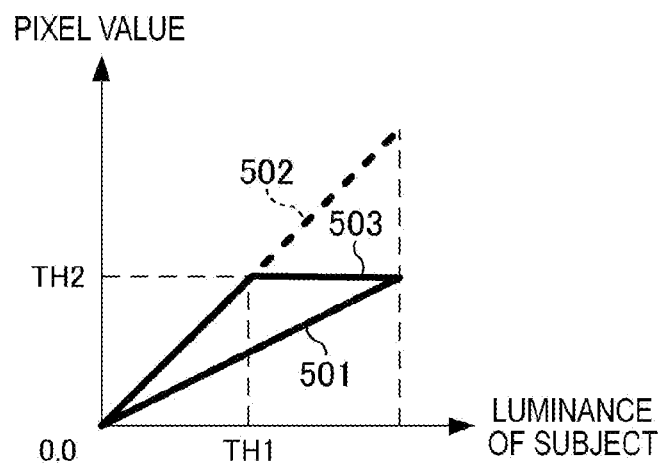
FIG. 5, illustrating an embodiment of the present invention, is a drawing for explaining an operation of an image synthesizing unit illustrated in FIG. 2 and FIG. 7.

FIG. 5, illustrating an embodiment of the present invention, is a drawing for explaining operation of the image synthesizing unit 230 illustrated in FIG. 2. In FIG. 5, the horizontal axis shows the luminance of the subject H, and the vertical axis shows the pixel value. In the present embodiment, luminance of the subject H may be obtained by referring to the pixel value of the corrected underexposure image, for example.

In the present embodiment, a reference sign 501 denotes a corrected underexposure image. In the present embodiment, a reference sign 503 denotes a corrected proper exposure image. A reference sign TH2 denotes a saturation level of a pixel. When a bright subject H is imaged with proper exposure, the pixel value is clipped at the saturation level TH2. A reference sign TH1 denotes a given threshold representing luminance of the subject H corresponding to the saturation level of proper exposure. In the present embodiment, a reference sign 502 denotes a gain-increased underexposure image obtained by increasing the gain by 1.5 levels of the corrected underexposure image 501. In the present embodiment, as the corrected underexposure image 501 is lower by 1.5 levels than the corrected proper exposure image 503, it is possible to match the luminance thereof with the luminance of the corrected proper exposure image 503 by increasing the gain by 1.5 levels.

In the present embodiment, in the example illustrated in FIG. 5, in the case of a pixel position in which the luminance of the subject H is darker than the given threshold TH1 (having a value smaller than TH1), the image synthesizing unit 230 selects and outputs the corrected proper exposure image 503 which is an input image of a larger exposure amount. Further, in the example illustrated in FIG. 5, in the case of a pixel position in which the luminance of the subject H is equaled to or brighter than the given threshold TH1 (having a value equaled to or larger than TH1), the image synthesizing unit 230 selects and outputs the gain-increased underexposure image 502 which is an input image of a smaller exposure amount. Thereby, a dynamic range enlarged image can be output.

According to the present embodiment, when dynamic range enlargement processing is performed using pupil-divided images in an image sensor which can be used for both imaging and focus detection, even if there is an influence of shading caused by vignetting of the pupil, it is possible to achieve a wide dynamic range enlargement effect. In more detail, according to the present embodiment, as it is configured to select images to be used for image synthesizing processing from a plurality of pupil-divided images according to the position of the imaging area in the imaging unit 105 (FIG. 6), when performing dynamic range enlargement processing, it is possible to prevent degradation of the quality of an image. It should be noted that HDR synthesis processing for enlarging the dynamic range in the present embodiment includes generation of an HDR synthetic image in which the apparent dynamic range is enlarged by performing synthesis on respective exposure images at the same number of gradations (number of bits) by matching the luminance, for example. Further, the HDR synthesis processing also includes generation of an HDR synthetic image in which the number of gradations is increased by performing synthesis while maintaining the level difference in the luminance.

Second Embodiment

Next, a second embodiment of the present invention will be described.

A digital camera (image processing device) according to the second embodiment has a configuration similar to the schematic configuration of the digital camera according to the first embodiment illustrated in FIG. 1.

In the present embodiment, the imaging unit 105 illustrated in FIG. 1 is exposed in two separate accumulations such as an accumulation with underexposure for an underexposure image and an accumulation with proper exposure for a proper exposure image, in the non-addition mode described in Japanese Patent Application Laid-Open No. 2002-199284. In the present embodiment, the imaging unit 105 illustrated in FIG. 1 reads four images, namely an underexposure image A, an underexposure image B, a proper exposure image A, and a proper exposure image B, separately. Then, in the present embodiment, the image processing unit 107 of FIG. 1 performs dynamic range enlargement addition using the four images.

Next, operation of the digital camera 100 according to the second embodiment, an inner configuration of the image processing unit 107 according to the second embodiment, and the like, will be described using FIG. 7 and FIG. 8.

Figure 8:
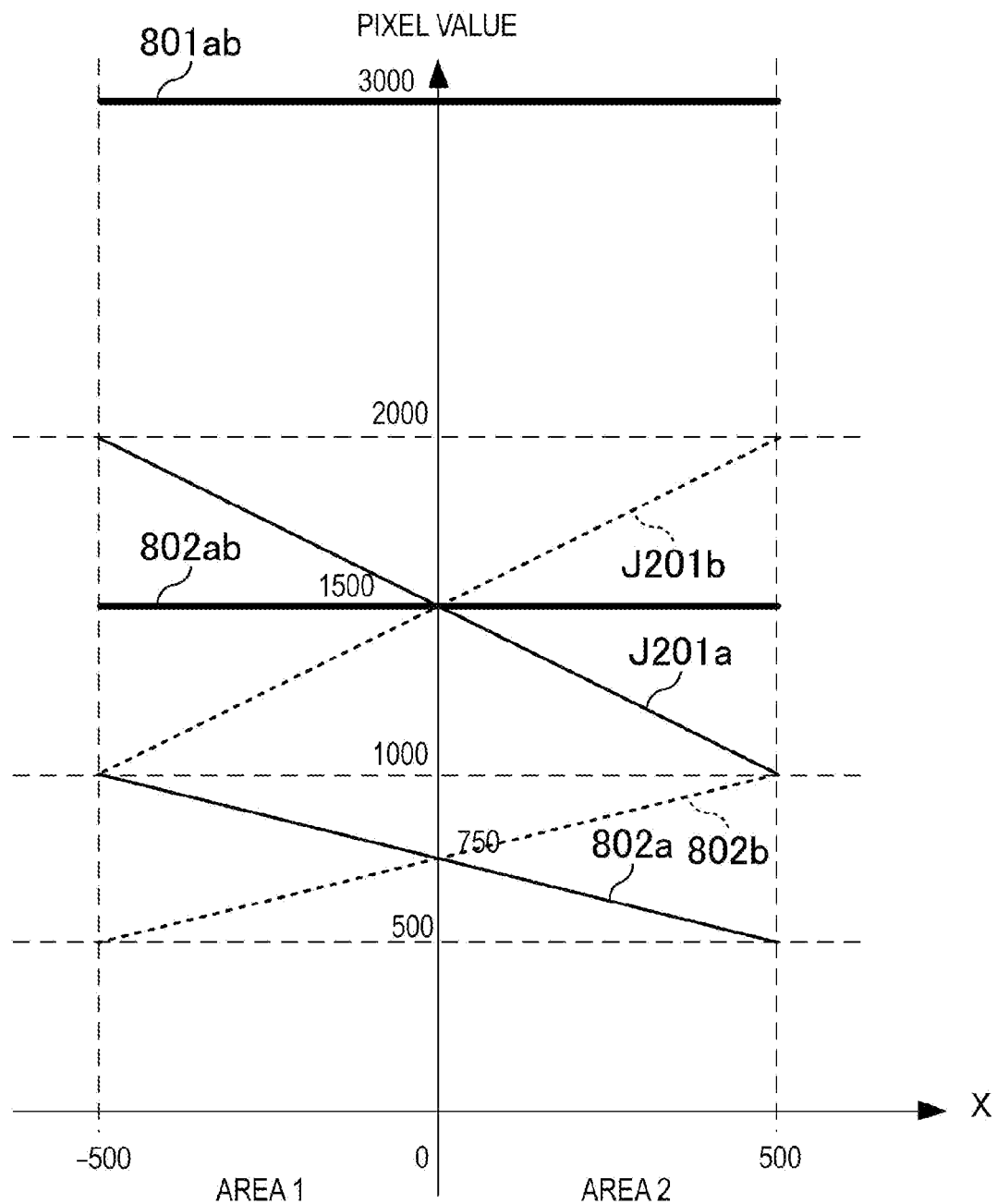
FIG. 8 is a drawing for explaining exemplary processing of obtaining two images of different exposures in a digital camera (image processing device) according to the second embodiment of the present invention.

FIG. 8 is a drawing for explaining exemplary processing of obtaining two images of different exposures in the digital camera (image processing device) according to the second embodiment of the present invention. In FIG. 8, the exposure level difference between the proper and the underexposure is set to be one level. Further, in FIG. 8, the horizontal axis shows the pixel position (X) in the imaging area of the imaging unit 105, and the vertical axis shows the pixel value. Further, in the present embodiment, the imaging area of the imaging unit 105 is assumed to be divided into a plurality of areas including at least an area 1 (first area) and an area 2 (second area) as illustrated in FIG. 8.

In FIG. 8, a reference sign J201a denotes a proper exposure pupil-divided image (proper exposure image A) obtained with a proper exposure amount from the subpixel J110a illustrated in FIG. 9. A reference sign J201b denotes a proper exposure pupil-divided image (proper exposure image B) obtained with a proper exposure amount from the subpixel J110b illustrated in FIG. 9. A reference sign 801ab denotes a proper exposure addition image (proper exposure image (A+B)) obtained by adding the proper exposure pupil-divided image (proper exposure image A) J201a of the subpixel J110a illustrated in FIG. 9 and the proper exposure pupil-divided image (proper exposure image B) J201b of the subpixel J110b illustrated in FIG. 9.

Further, in FIG. 8, a reference sign 802a denotes an underexposure pupil-divided image (underexposure image A) obtained with an underexposure amount from the subpixel J110a illustrated in FIG. 9. A reference sign 802b denotes an underexposure pupil-divided image (underexposure image B) obtained with an underexposure amount from the subpixel J110b illustrated in FIG. 9. A reference sign 802ab denotes an underexposure addition image (underexposure image (A+B)) obtained by adding the underexposure pupil-divided image (underexposure image A) 802a of the subpixel J110a illustrated in FIG. 9 and the underexposure pupil-divided image (underexposure image B) 802b of the subpixel J110b illustrated in FIG. 9.

Figure 7:
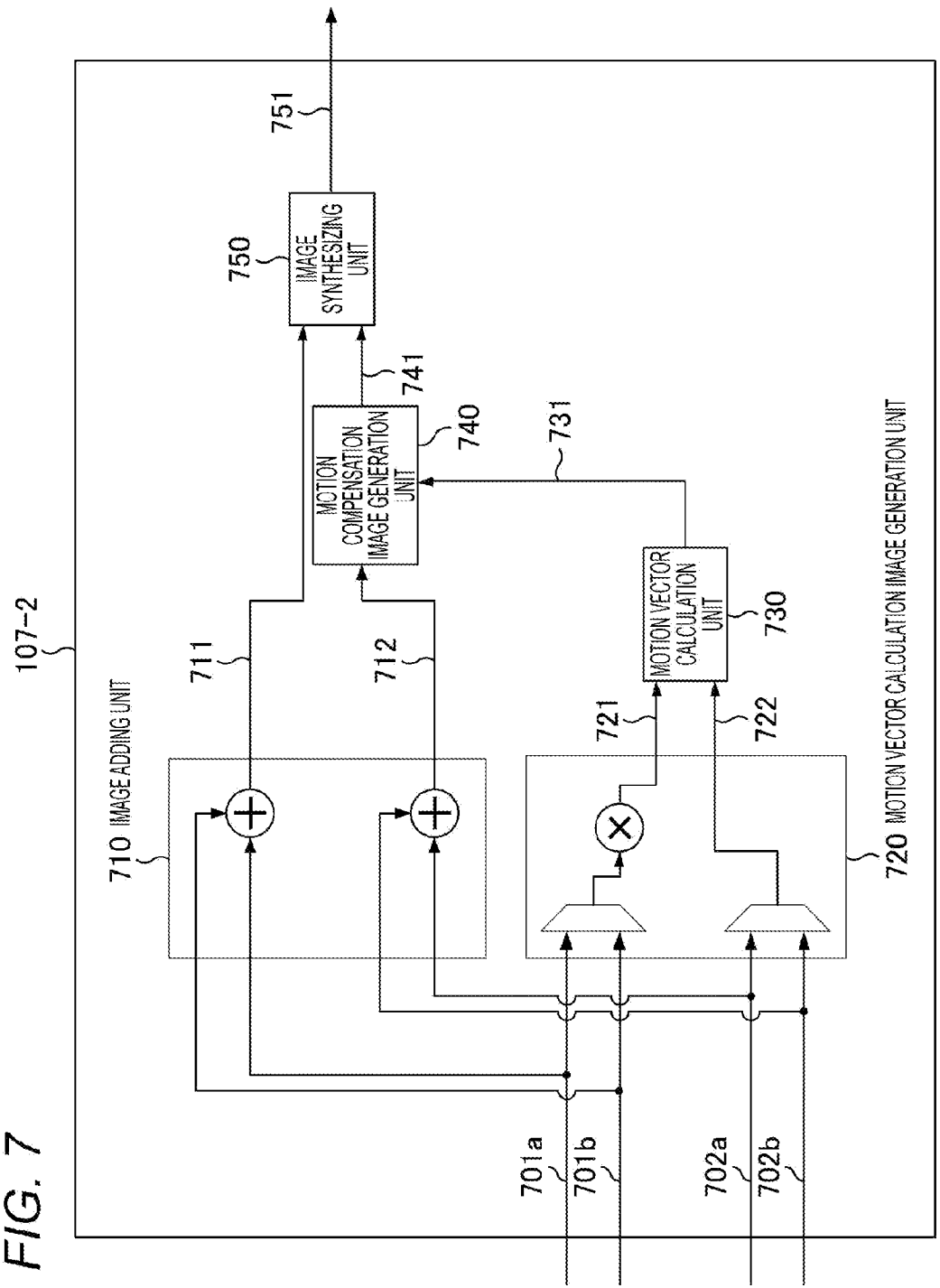
FIG. 7, illustrating a second embodiment of the present invention, is a drawing illustrating an exemplary inner configuration of the image processing unit illustrated in FIG. 1.

FIG. 7, illustrating the second embodiment of the present invention, is a drawing illustrating an exemplary inner configuration of the image processing unit 107 illustrated in FIG. 1. Here, the image processing unit 107 illustrated in FIG. 7 is denoted as an "image processing unit 107-2".

A reference sign 701a denotes an underexposure image A input (input of the underexposure image A 802a of FIG. 8). A reference sign 701b denotes an underexposure image B input (input of the underexposure image B 802b of FIG. 8). A reference sign 702a denotes a proper exposure image A input (input of the proper exposure image A J201a of FIG. 8). A reference sign 702b denotes a proper exposure image B input (input of the proper exposure image B J201b of FIG. 8).

A reference sign 710 denotes an image adding unit. The image adding unit 710 adds the underexposure image A 802a of FIG. 8 and the underexposure image B 802b of FIG. 8 to thereby generate an underexposure image (A+B) 802ab of FIG. 8 which is an underexposure addition image. Further, the image adding unit 710 adds the proper exposure image A J201a of FIG. 8 and the proper exposure image B J201b of FIG. 8 to thereby generates a proper exposure image (A+B) 801ab of FIG. 8 which is a proper exposure addition image. Here, the proper exposure image (A+B) 801ab constitutes a first addition image, and the underexposure image (A+B) 802ab constitutes a second addition image.

A reference sign 720 denotes a motion vector calculation image generation unit. In the area 1 of FIG. 8, the motion vector calculation image generation unit 720 selects the underexposure image B 802b and the proper exposure image B J201b as images to be used for motion vector calculation processing described below. Further, in the area 2 of FIG. 8, the motion vector calculation image generation unit 720 selects the underexposure image A 802a and the proper exposure image A J201a as images to be used for motion vector calculation processing described below. In the present embodiment, the motion vector calculation image generation unit 720, which selects images to be used for motion vector calculation processing, constitutes a selection unit. It should be noted that in the present embodiment, while a function by the motion vector calculation image generation unit 720 is performed in the image processing unit 107-2, it may be performed as a function of the control unit 101, for example. Further, the motion vector calculation image generation unit 720 outputs the selected underexposure image A 802a or the underexposure image B 802b after increasing the gain such that the luminance thereof matches that of the proper exposure. In the present embodiment, as the exposure level difference between the proper exposure and the underexposure is one level, the selected image is output after the gain is increased by one level.

A reference sign 730 denotes a motion vector calculation unit. The motion vector calculation unit 730 has a configuration similar to that of the conventional art described in Japanese Patent Application Laid-Open No. 2009-258868, for example, and detects a motion vector by performing a block search for a reference frame with a target frame. Specifically, in the present embodiment, the motion vector calculation unit 730 calculates a motion vector between a plurality of pupil-divided images captured by the imaging unit 105 with a plurality of exposure amounts (proper exposure amount and underexposure amount) for each of the areas (area 1 and area 2) of the imaging unit 105.

A reference sign 721 denotes a target frame input. As the target frame input 721, either the gain-increased underexposure image A 802a or the gain-increased underexposure image B 802b is input. A reference sign 722 denotes a reference frame input. As the reference frame input 722, either the proper exposure image A J201a or the proper exposure image B J201b is input.

A reference sign 740 denotes a motion-compensated image generation unit. The motion-compensated image generation unit 740 has a configuration similar to that of the conventional art described in Japanese Patent Application Laid-Open No. 2009-258868. Specifically, the motion-compensated image generation unit 740 generates a motion-compensated image by performing motion compensation on a reference frame (specifically, the proper exposure image (A+B) 801ab) using the motion vector calculated by the motion vector calculation unit 730.

A reference sign 731 denotes a motion vector input (input of the motion vector calculated by the motion vector calculation unit 730). A reference sign 712 denotes a reference frame input, and the proper exposure image (A+B) 801ab is input.

A reference sign 750 denotes an image synthesizing unit. The image synthesizing unit 750 generates a dynamic range enlarged image as a synthesis image by performing image synthesizing on the underexposure image (A+B) 802ab of FIG. 8 and the proper exposure image (A+B) 801ab to which motion compensation has been applied.

A reference sign 711 denotes an underexposure image (A+B) input (input of the underexposure image (A+B) 802ab of FIG. 8). A reference sign 741 denotes a motion-compensated proper exposure image (A+B) input (input of the proper exposure image (A+B) 801ab to which motion compensation has been applied). A reference sign 751 denotes a dynamic range enlarged image output.

Here, operation of the image synthesizing unit 750 illustrated in FIG. 7 will be described using FIG. 5.

FIG. 5, illustrating an embodiment of the present invention, is a drawing for explaining operation of the image synthesizing unit 750 illustrated in FIG. 7. In FIG. 5, the horizontal axis shows the luminance of the subject H, and the vertical axis shows the pixel value. Here, in the present embodiment, the luminance of the subject H may be obtained with reference to the pixel value of the underexposure (A+B) image, for example.

In the present embodiment, a reference sign 501 denotes an underexposure image (A+B). In the present embodiment, a reference sign 503 denotes a motion-compensated proper exposure image (A+B). A reference sign TH2 denotes a saturation level of a pixel. When a bright subject H is imaged with proper exposure, the pixel value is clipped at the saturation level TH2. A reference sign TH1 denotes a given threshold representing the luminance of the subject H corresponding to the saturation level of the proper exposure. In the present embodiment, a reference sign 502 denotes a gain-increased underexposure image (A+B) obtained by increasing the gain by one level of the underexposure image (A+B) 501. In the present embodiment, as the underexposure image (A+B) 501 is lower by one level from the motion-compensated proper exposure image (A+B) 503, by increasing the gain by one level, it is possible to match the luminance thereof to that of the motion-compensated proper exposure image (A+B) 503.

In the present embodiment, in the example illustrated in FIG. 5, in the case of a pixel position in which the luminance of the subject H is darker than the given threshold TH1 (having a value smaller than TH1), the image synthesizing unit 750 selects and outputs the motion-compensated proper exposure image (A+B) 503 which is an input image of a larger exposure amount. Meanwhile, in the example illustrated in FIG. 5, in the case of a pixel position in which the luminance of the subject H is equaled to or brighter than the given threshold TH1 (having a value equaled to or larger than TH1), image synthesizing unit 750 selects and outputs the gain-increased underexposure image (A+B) 502 which is an input image of a smaller exposure amount. Thereby, a dynamic range enlarged image can be output.

In the present embodiment, as image synthesizing for enlarging the dynamic range is performed using an addition image obtained by adding pupil-divided images, the present embodiment is not influenced by shading caused by vignetting of the pupil. On the other hand, as calculation of a motion vector is performed using pupil-divided images, block matching can be performed using images having a deeper depth of field, compared with the case of using an addition image obtained by adding pupil-divided images, which enables the motion vector calculation performance to be improved. Further, as an image having larger vignetting of the pupil, of two pupil-divided images, is selected, the depth of field can be deeper.

As such, according to the present embodiment, in the image sensor capable of being used for both imaging and focus detection, image alignment can be performed with high accuracy even in the case of performing exposure in two different accumulations including an accumulation with underexposure for an underexposure image and an accumulation with proper exposure for a proper exposure image. Thereby, it is possible to prevent degradation of the quality of an image.

According to the present invention, when performing dynamic range enlargement processing using a plurality of images obtained from different pupil regions, it is possible to prevent degradation of the quality of an image.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-064116, filed Mar. 26, 2014, which is hereby incorporated by reference herein in its entirety.

What is claimed is:

1. An image processing device comprising:
an image sensor configured to capture a plurality of pupil-divided images obtained from light fluxes passing through different pupil regions of an imaging optical system; and
a selection unit configured to select an image to be used for image processing from the plurality of pupil-divided images, according to a position of an imaging area in the image sensor,
wherein
the plurality of pupil-divided images includes at least a first pupil-divided image obtained from a first pixel in the image sensor, and a second pupil-divided image obtained from a second pixel in the image sensor,
the imaging area in the image sensor is divided into a plurality of areas including at least a first area and a second area,
regarding the first area, the selection unit selects the first pupil-divided image as an image which involves a first exposure amount and is used for the image processing, and selects another pupil-divided image, other than the first pupil-divided image, as an image which involves a second exposure amount less than the first exposure amount and is used for the image processing, and
regarding the second area, the selection unit selects the second pupil-divided image as an image which involves the first exposure amount and is used for the image processing, and selects another pupil-divided image, other than the second pupil-divided image, as an image which involves the second exposure amount and is used for the image processing.

2. The image processing device according to claim 1, further comprising
a brightness nonuniformity correction unit configured to correct brightness nonuniformity caused by vignetting of the pupil, with respect to the image to be used for the image processing selected by the selection unit.

3. The image processing device according to claim 1, further comprising
an image synthesizing unit configured to generate a synthesis image by synthesizing a plurality of the pupil-divided images selected by the selection unit, for each of the plurality of areas.

4. The image processing device according to claim 3, wherein
the image synthesizing unit selects and outputs an input image of a larger exposure amount if luminance of a subject is darker than a given threshold, while selects and outputs an input image of a smaller exposure amount if the luminance of the subject is brighter than the given threshold.

5. The image processing device according to claim 1, wherein
the image sensor is configured to capture the plurality of pupil-divided images with a plurality of exposure amounts, and
the image processing device further comprises a motion vector calculation unit configured to calculate a motion vector between a plurality of the pupil-divided images captured by the image sensor with the plurality of exposure amounts, for each of a plurality of areas of the imaging area in the image sensor.

6. The image processing device according to claim 5, wherein
the plurality of pupil-divided images include at least a first pupil-divided image obtained from a first pixel in the image sensor, and a second pupil-divided image obtained from a second pixel in the image sensor,
the imaging area in the image sensor is divided into a plurality of areas including at least a first area and a second area,
the image sensor performs imaging with a plurality of exposure amounts including at least a first exposure amount and a second exposure amount which is less than the first exposure amount, and
regarding the first area, the motion vector calculation unit calculates the motion vector between pupil-divided images, other than the first pupil-divided image, captured with the first exposure amount and the second exposure amount, and regarding the second area, the motion vector calculation unit calculates the motion vector between pupil-divided images, other than the second pupil-divided image, captured with the first exposure amount and the second exposure amount.

7. The image processing device according to claim 6, further comprising:
at least an image adding unit configured to generate a first addition image by adding a plurality of pupil-divided images captured by the image sensor with the first exposure amount, and generate a second addition image by adding a plurality of pupil-divided images captured by the image sensor with the second exposure amount;

at least a motion compensation unit configured to generate a motion-compensated image by performing motion compensation on the first addition image with use of the motion vector; and at least an image synthesizing unit configured to generate a synthesis image by synthesizing the second addition image and the motion-compensated image.

8. The image processing device according to claim 1, wherein in the first area, the first pupil-divided image has a smaller vignetting amount of the pupil than a vignetting amount of the second pupil-divided image, and in the second area, the second pupil-divided image has a smaller vignetting amount of the pupil than a vignetting amount of the first pupil-divided image.

9. The image processing device according to claim 1, wherein the image processing includes high dynamic range (HDR) synthesis processing.

10. The image processing device according to claim 1, wherein the image processing includes calculating a motion vector between the plurality of pupil-divided images.

11. A method of controlling an image processing device including an image sensor, the method comprising:

a capture step of capturing, using the image sensor, a plurality of pupil-divided images obtained from light fluxes passing through different pupil regions of an imaging optical system; and a selection step of selecting an image to be used for high dynamic range (HDR) synthesis processing from the plurality of pupil-divided images according to a position of an imaging area in the image sensor, wherein the capture step of capturing a plurality of pupil-divided images includes capturing at least a first pupil-divided image obtained from a first pixel in the image sensor, and a second pupil-divided image obtained from a second pixel in the image sensor, the imaging area in the image sensor is divided into a plurality of areas including at least a first area and a second area, regarding the first area, the selection step selects the first pupil-divided image as an image which involves a first exposure amount and is used for the synthesis processing, and selects another pupil-divided image, other than the first pupil-divided image, as an image which involves a second exposure amount less than the first exposure amount and is used for the synthesis processing, and regarding the second area, the selection step selects the second pupil-divided image as an image which involves the first exposure amount and is used for the synthesis processing, and selects another pupil-divided image, other than the second pupil-divided image, as an image which involves the second exposure amount and is used for the synthesis processing.

12. A non-transitory computer readable storage medium recording a program for causing a computer to perform a method of controlling an image processing device including an image sensor, the program causing the computer to perform the method comprising:

a capture step of capturing, using the image sensor, a plurality of pupil-divided images obtained from light fluxes passing through different pupil regions of an imaging optical system; and a selection step of selecting an image to be used for high dynamic range (HDR) synthesis processing from the plurality of pupil-divided images according to a position of an imaging area in the image sensor, wherein the capture step of capturing a plurality of pupil-divided images includes capturing at least a first pupil-divided image obtained from a first pixel in the image sensor, and a second pupil-divided image obtained from a second pixel in the image sensor, the imaging area in the image sensor is divided into a plurality of areas including at least a first area and a second area, regarding the first area, the selection step selects the first pupil-divided image as an image which involves a first exposure amount and is used for the synthesis processing, and selects another pupil-divided image, other than the first pupil-divided image, as an image which involves a second exposure amount less than the first exposure amount and is used for the synthesis processing, and regarding the second area, the selection step selects the second pupil-divided image as an image which involves the first exposure amount and is used for the synthesis processing, and selects another pupil-divided image, other than the second pupil-divided image, as an image which involves the second exposure amount and is used for the synthesis processing.

* * * * *